June 4, 1963 E. J. PETERS 3,091,847
METHOD OF MANUFACTURE OF METAL ENCASED CORE MATERIAL
Filed Oct. 29, 1958 2 Sheets-Sheet 1
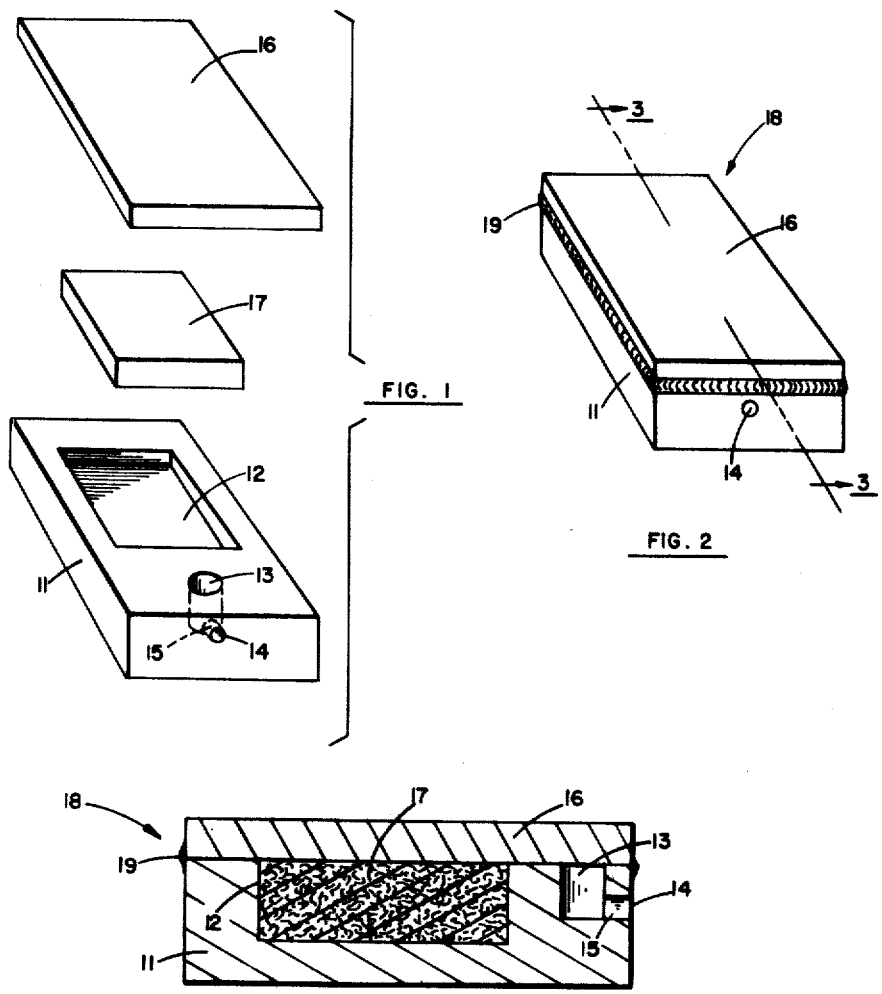
INVENTOR.
ERNEST J. PETERS
BY
William N. Patrick
AGENT June 4, 1963 E. J. PETERS 3,091,847
METHOD OF MANUFACTURE OF METAL ENCASED CORE MATERIAL
Filed Oct. 29, 1958 2 Sheets-Sheet 2
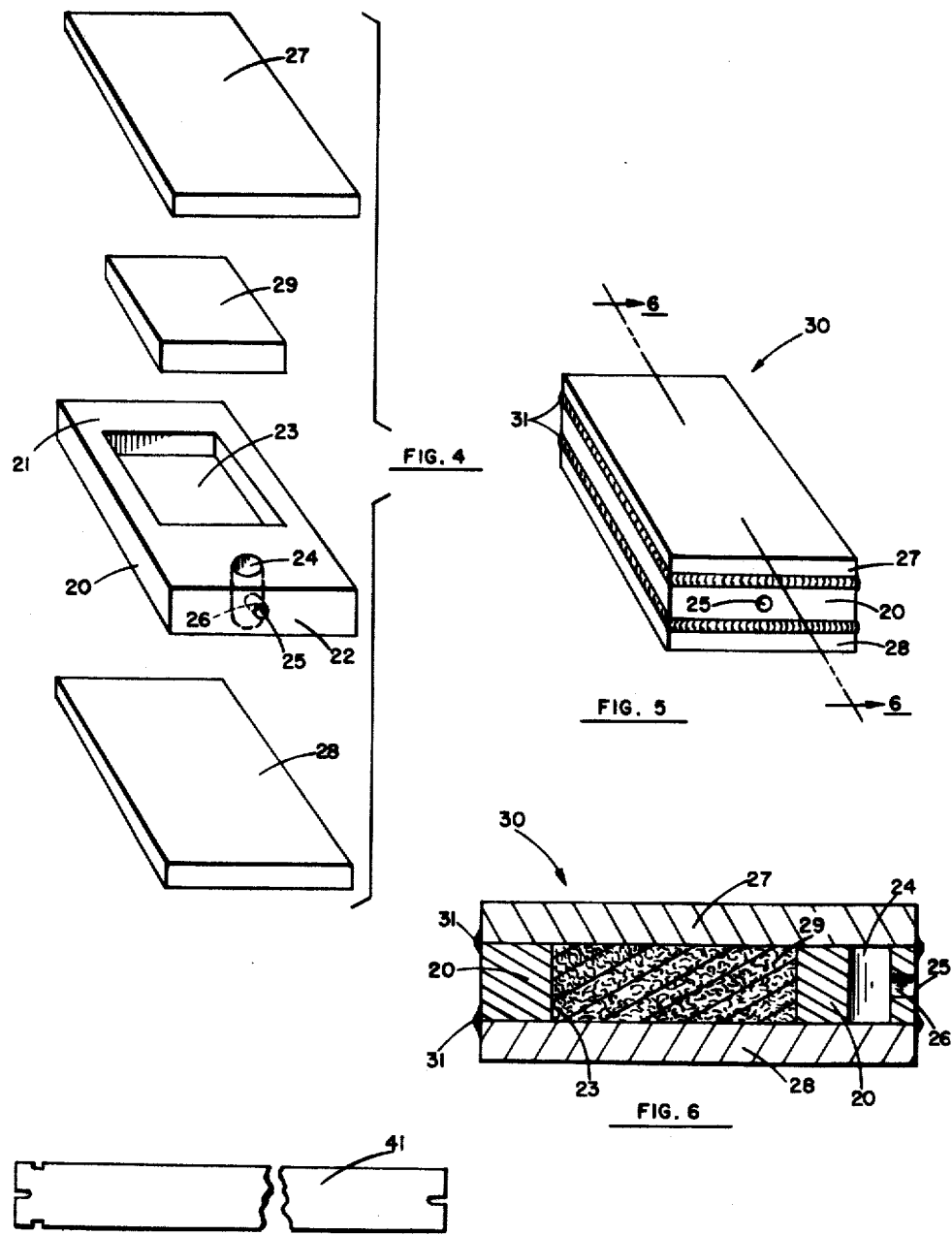
INVENTOR.
ERNEST J. PETERS
BY
William N. Patrick
AGENT

United States Patent Office 3,091,847
Patented June 4, 1963

3,091,847
METHOD OF MANUFACTURE OF METAL EN-CASED CORE MATERIAL
Ernest J. Peters, Santa Susana, Calif., assignor, by mesne assignments, to the United States of America as represented by the United States Atomic Energy Commission
Filed Oct. 29, 1958, Ser. No. 770,454
4 Claims. (Cl. 29—471.5)

This invention relates to a method of manufacturing an article consisting of a core material completely encased in a metallic substance. More particularly, this invention relates to a method of manufacturing nuclear reactor fuel elements.

Nuclear reactors are fueled by a fissionable material which gives off a large amount of heat upon undergoing fission. The heat is carried away in many instances by an appropriate coolant such as liquid sodium or a hydrocarbon fluid. In order to protect the fuel and prevent contamination or reaction with the coolant, the former is often encased in a suitable material such as aluminum or steel. In the process of encasing the fissionable material in a suitable cladding, it is often necessary that the cladding be bonded to itself along certain surface areas in order to completely enclose the fuel. Since such bonding is usually accomplished at elevated temperatures at which the surfaces of the cladding material may readily oxidize, difficulties have been encountered in obtaining a satisfactory bond which would ensure an envelope of protection for the fuel and prevent contact with the coolant substance.

One method of manufacturing nuclear reactor fuel plates is described in the Proceedings of The International Conference on the Peaceful Uses of Atomic Energy, 9,204 (1956), published by United Nations, New York. The article describes a method of encasing a reactor fuel bearing alloy in aluminum by the picture frame technique. The wrought aluminum encasement jacket consists of a frame piece for enclosing the four lateral sides, and a cover sheet for each side of the frame piece. The assembled fuel plate is hot rolled to achieve a bond between the cover sheets and the frame piece. While this technique is suitable for encasing a substance in aluminum, a satisfactory bond cannot be obtained when the encasing material is steel or other metals and alloys which oxidize readily at the bonding temperature. When such oxidizable materials are employed, the oxides which form on the bonding surfaces prevent the formation of a satisfactory bond with the result that the cladding offers no protection to the reactor fuel and the fuel plate cannot be used in nuclear reactor. Certain types of nuclear power reactors, however, because of the coolant material employed, require the use of fuel plates having an outer casing of steel or other high temperature oxidizable materials. Thus, the need of a satisfactory method of manufacturing such fuel plates is apparent.

It is, therefore, an object of this invention to provide a method for encasing a core material in a metallic substance. It is also an object of this invention to provide a method for the manufacture of an article consisting of a core material completely encased in a metallic substance. It is also an object of this invention to provide a method for bonding metallic structures under pressure at elevated temperatures without contaminating the bonding surfaces. It is likewise an object of this invention to provide a method for encasing a fissionable material in a protective metallic substance. Another object is to provide a method for the manufacture of nuclear reactor fuel elements. Still another object is to provide a method for the manufacture of plate-type nuclear reactor fuel elements. It is also an object of this invention to provide a method for the manufacture of steel-clad uranium oxide fuel elements. The above and other objects of this invention will become more apparent from the discussion which follows.

The above and other objects of this invention are accomplished by a method of manufacturing an article consisting of a core material completely encased in a metallic substance comprising (1) providing a first metallic member containing a first cavity in a first portion of said first member, a second cavity in a second portion of said first member, and a perforation in a third portion of said first member, said second cavity being connected to said perforation by a channel leading from said second cavity to said perforation; a second metallic member designed to enclose said first cavity and said second cavity when placed over said cavities and in juxtaposition to said first member and a core material which is stable at the bonding temperature of said members; (2) placing said core material in said first cavity and placing said second member in juxtaposition to said first member so as to enclose said first cavity and said second cavity; (3) sealing said second member to said first member along the outer edge of area of contact of said members with each other to form an assembled article; (4) heating said assembled article to a temperature sufficient for bonding of said members; and (5) applying pressure to said heated assembled article and thereby causing said members to bond at points of contact.

The process of this invention may be more readily understood by reference to the accompanying drawings. FIGURE 1 shows the component elements of an article manufactured by the process of this invention. FIGURE 2 shows an assembled structure. FIGURE 3 shows a cross section of the structure of FIGURE 2 taken along the line 3—3. FIGURE 4 shows the component parts of an article manufactured by the modified version of the process of this invention. FIGURE 5 shows an assembled structure employing the components shown in FIGURE 4. FIGURE 6 is a cross section of the structure in FIGURE 5 taken along the line 6—6. FIGURE 7 shows a top view of a finished nuclear fuel element.

In FIGURE 1 a first metallic member 11 contains a first cavity 12 in a first portion of its surface area, a second cavity 13 in a second portion of its surface area, and a perforation 14 in a third portion of its surface area. The second cavity 13 is connected to the perforation 14 by a channel 15 leading from said second cavity to the perforation. The second metallic member 16 is designed to enclose the first cavity 12 and the second cavity 13 when placed over these cavities and in juxtaposition to the first member 11. The core material 17, which is stable at the bonding temperature of the members, is designed to fit into the first cavity 12. In carrying out the process of this invention, the core material 17 is placed in the first cavity 12, and the second metallic member 16 is placed over the first metallic member 11, so as to enclose the second cavity 13 as well as the first cavity 12 containing the core material 17. The first and second members are then sealed together along the outer edge of area of contact of the members with each other to form an assembled article or structure. The sealing is performed by any method which will provide a substantially gas impervious joint between the members at the bonding temperature of the members. This may be accomplished by welding, brazing, soldering, organic and inorganic adhesives, etc. The assembled and sealed article or structure will have the appearance of the article shown in FIGURE 2. In FIGURE 2, the first metallic member 11 containing the perforation 14 is sealed to the second metallic member 16 along the outer edge of the area of contact of these members with each other to form the sealed joint 19 of the assembled article 18. The sealed joint 19 is magnified in FIGURE 2 for illustration purposes.

FIGURE 3 shows a cross section of the assembled structure of FIGURE 2 along the line 3—3. In this figure, the core material 17 is shown in the first cavity 12 of the first metallic member 11. The first metallic member 11 contains a second cavity 13 which is connected by a channel 15 to a perforation 14 in the surface of the first metallic member 11. The perforation 14 is not covered or obstructed by the second metallic member 16 when this second member is placed in juxtaposition to the first member so as to enclose or cover the first cavity 12 and the second cavity 13 to form the assembled structure 18. The assembled structure 18 is sealed along the outer edge 19 of the area of contact of the second member 16 with the first member 11. The assembled and sealed article and structure is then heated to a temperature sufficient for bonding of the members. During the heating, excess gaseous impurities are driven out from the first cavity 12 and from the interface between the first member 11 and the second member 16 through the second cavity 13 and out through channel 15 connecting the cavity with the perforation 14 in a surface of the first metallic member 11. Pressure is then applied to the heated and assembled sealed structure in order to bond the second metallic member 16 to the first metallic member 11. It is important that a bond be obtained between the first and second members along the periphery of the first cavity which is free from any defects. Since the structure is sealed at the junction of the first and second metallic members, the only way that contaminants from the atmosphere, such as oxygen, can enter into the interface to contaminate the bonding surfaces is through the small perforation 14 which leads to the cavity 13. Since the passage of the gases by this route would be very slow, a satisfactory bond is obtained at the points of contact of the first member with the second member along the periphery of the first cavity before contamination of the bonding surfaces can result.

In a modification of the process of this invention, the assembled structure or article is brought up to the bonding temperature of the metallic elements by heating in an atmosphere of hydrogen. The hydrogen thus displaces the gases which may be present in the cavities, in the channel, and at the interface between the first and second members. Thus gaseous contaminants are removed and any oxides which may have been formed are reduced so that hydrogen is the prevailing gas in the cavities at the interface between the first and second metallic members. Upon applying pressure to the heated and sealed metallic structure or article a bond is obtained along points of contact of the first metallic member with the second metallic member along the periphery of the first cavity which is free from any defect since the bonding operation can be performed before any gaseous contaminants can diffuse through the small perforation and the connecting channel into the second cavity which is connected to the interface between the first and second metallic members. In fact, as pressure is applied to the assembled structure, excess hydrogen escapes from within the sealed structure through the perforation 14 and is evidenced by a small hydrogen flame at this perforation during the pressure application. Thus, gaseous contaminants are easily kept away from the bonding surfaces during the bonding process.

The pressure is applied to the heated and assembled structure in a direction normal to a plane passing through the points of contact of said members with each other. This pressure is first applied along points at the outer edge of the structure adjacent a boundary line of the first cavity which is furthest removed from the second cavity. The points of pressure are progressively moved along the surface of the structure in the direction of the second cavity until the entire structure has been subjected to pressure. One way of accomplishing this is by passing the assembled and heated structure through a steel rolling mill. In other words, when passing the heated and sealed structure through a rolling mill, the edge of the structure which is furthest removed from the surface containing the perforation is fed into the mill first so that the portion of the assembled structure which contains the perforation passes through the rolls lastly. In that manner, any gas contained within the sealed structure is forced out through the perforation as evidenced by burning hydrogen at the perforation during the rolling process when the assembled structure has been first heated in an atmosphere of hydrogen. In this process the portion of the surface area of the members in the vicinity of the second cavity, which is connected by a channel to the perforation, are the last to be subjected to a bonding pressure. The first cavity containing the core material is completely sealed with no deleterious contaminating gases present.

An embodiment of this invention is to apply such pressure in the bonding operation, as for example in the case of steel rolling mill process, as is sufficient to reduce the value of the dimension of the assembled structure measure perpendicularly to a plane passing through the points of contact of the assembled members. A further embodiment of this invention is to subject the assembled, sealed, and heated structure to a plurality of successive pressure application, each resulting in a reduction in the value of the above mentioned dimension until a predetermined value of the dimension has been obtained.

When the process of this invention is used in the manufacture of fuel plates for the preparation of nuclear reactor fuel elements, the core material is a fissionable element-containing material such as a uranium-containing material, and the members which constitute the outside casing of the completed article may be of a material such as steel. An embodiment of this invention is a process for the manufacture of an article containing a core material completely encased in a metallic substance in which the core material is composed substantially of uranium oxide and steel and the members used to encase the core material are made of steel.

FIGURE 4 shows a modification in the elements used in the process of this invention when compared with the elements used as illustrated in FIGURE 1. In FIGURE 4, a combination of the first metallic member 20 and the third metallic member 28 is required to form the equivalent of the first metallic member 11 of FIGURE 1. In FIGURE 4 the first metallic member 20 has at least a first surface 21, a second surface which is not shown in the diagram and which is on the reverse side of the first metallic member 20, and a third surface 22. A first aperture 23 is located in a first portion of said first metallic member, a second aperture 24 in a second portion of said first member, wherein said apertures connect said first surface 21 with said second surface; and a perforation 25 located in its third surface 22. The second aperture 24 is connected to the perforation 26 by a channel 26 leading from the second aperture to the perforation. The third metallic member 28 is designed to contact all points on the second surface of the first member 20 which are located along the periphery of the apertures when placed in juxtaposition to the first member along the second surface. A second metallic member 27 is likewise designed to contact all points on the first surface of the first member 20 which are located along the periphery of the apertures when placed in juxtaposition to the first member along the first surface. In assembling the structure the core material 29 which is stable at the bonding temperatures of the members, is placed in the first aperture 23. The second metallic member 27 is placed in juxtaposition to the first member along the first surface, and the third metallic member 28 is placed in juxtaposition to the first member 22 along the second surface in such a fashion that the second member and third member completely enclose the first aperture 23 containing the core material 29 and also completely enclose the second aperture 24 except for the opening from aperture 24 to channel 26 which leads to perforation 25. The second and third members are sealed to the first member along the outer edge of the area of contact of the second member and the third member with the first member to form an assembled structure as shown in FIGURE 5.

FIGURE 5 shows an assembled structure 30 made up of the first member 20 containing perforation 25, the second member 27 and a third member 28. The joints 31 of the second and third members with the first member are sealed by welding or other appropriate means.

FIGURE 6 shows a cross section of the assembled and sealed structure of FIGURE 5 taken along the line 6—6. In this view, the assembled structure 30 is made up of the first metallic member 20 containing a first aperture 23, a second aperture 24, a perforation 25, and a channel 26 connecting perforation 25 with aperture 24; a second metallic member 27 and a third metallic member 28. The core material 29 is contained in the first aperture 23. The second and third members are sealed to the first member along the outer edge of the area of contact of the members 31.

When the structure of FIGURE 5 is subjected to pressure as described hereinabove, any gases contained within the structure are eliminated through the aperture 24, channel 26 and perforation 25. Except for the fact that an additional component is employed in the assembling of the structure, namely, element 28, the process is substantially the same as that described with respect to the structure of FIGURE 2.

As an embodiment of this invention, the structure of FIGURE 5 is also heated in an atmosphere of hydrogen prior to being subjected to pressure. The structure of FIGURE 5 is also subjected to rolling mill operations in the manner similar to that described hereinabove.

As in the case of the structure of FIGURE 2, the structure of FIGURE 5 can be composed of members of steel and a core material containing a fissionable element such as uranium. One suitable core material is found to be a mixture of uranium oxide and steel.

A top view of finished fuel plate 41 is shown in FIGURE 7. This is the appearance of the finished fuel plate after the assembled structure shown in FIGURE 5 has been subjected to successive reductions on a rolling mill followed by trimming and the cutting of slots for assembling into a fuel element box.

The following example will more clearly illustrate the process of this invention:

Example I

The elements shown in FIGURE 4 were used in the process of fabricating a nuclear reactor fuel plate. The reactor fuel was to be encased in 304 stainless steel. This steel contains a maximum of 0.08% carbon, about 2.0% manganese, 1% silicon, 18–20% chromium, 8–11% nickel, and the balance iron. The fuel compact to be encased in steel consisted of a mixture of 75 wt. percent stainless steel powder and 25 wt. percent of uranium dioxide containing fully enriched uranium. The 304 stainless-steel powder employed contained 2 wt. percent silicon to facilitate the powder manufacture. The powder particles were of a size which would pass through a 100-mesh screen and were 100% retained on a 325 mesh screen. The fully-enriched uranium oxide powder was fired from a minimum of one hour at 1700° to 1800° C. The particle size was such that 100% of the powder passed through 170-mesh screen and was retained on a 325-mesh screen. The stainless steel and $UO_2$ powders were blended and placed in a die with a 2.387-inch by 3.860-inches cavity. The cavity was loaded with 240 grams of the blended powders and pressed at 49 tons per square inch to produce a core compact approximately ¼-inch thick. The "green" compact was then sintered in a dry hydrogen atmosphere for 1½ hours at 2150° F.

The picture frame element shown as No. 22 in FIGURE 4 had outside dimensions of 6" x 4½" x ¼". The cover elements 27 and 28 in FIGURE 4 were 6" x 4½" x ⅟₁₆". The opening in element 22 into which the uranium oxide fuel compact 29 is placed, designated as aperture 23, had dimensions of 2.407" x 3.870". Aperture 24 had a diameter of ⅛", while the diameter of the perforation 25 was ⅟₁₆" in diameter. The cover plates and the picture frame were degreased and then sand-blasted with stainless shot prior to the assembly of structure. The cover plates 27 and 28 of FIGURE 4 were then welded to the central picture frame element 20, containing the compacted stainless-steel and uranium dioxide fuel 29 in the aperture 23. The welding operation was performed along the outer edges only as shown in the assembled structure in FIGURE 5. The only opening leading from the atmosphere into the interior of the structure was the perforation 25.

The assembled structure was heated at 2000° F. for 30 minutes in a dry hydrogen atmosphere. The heated structure was then passed through a steel rolling mill set to provide a 50% reduction in the thickness of the structure. During the first hot-rolling pass the structure was introduced into the rolls so that the end with the perforation or vent hole passed through the rolls lastly. This permitted the entrapped gases to escape and provided for closure of the hole as it passed through the rolls. During each of the subsequent passes through the mill, the sandwich was reversed end for end and turned over, face for face. The plate was reheated for each pass at 2000° F. After the fourth pass, the plate was removed from the furnace and cooled, and 5½" was sheared from the end that contained the exhaust hole or perforation to facilitate handling during subsequent passes. The structure was then reheated to 2000° F. and passed through the rolling mill an additional 6 times making a total of 10 passes through the mill. The temperature of the structure was brought up to 2000° F. after each pass through the rolling mill. In each of the first two passes a reduction of 50% in the thickness of the structure was obtained. A reduction of 20% was obtained in each of the next three passes. In the last 5 passes, the mill was set to provide a reduction of 15% each time the structure was passed through the mill. At the completion of the hot-rolling operation, the assembled structure had elongated from its original 6-inch length to a length of 48 inches and the width had increased from 4½ inches to 5 inches. The thickness of the fuel plate was substantially 0.038 inch.

During the hot-rolling operation an oxide coating, approximately 3 mils thick was formed on each surface of the fuel plate; this was removed by pickling the fuel plate for 1 hour and 160° F. in a solution containing 5 volume percent hydrofluoric acid, 20 volume percent nitric acid and the balance water. The plate, after pickling, was rinsed with water and air-dried.

The fuel plate was then cold rolled to a final dimension of .030" ± 0.001". The cold rolling operation served not only to reduce the plate thickness to the required thickness and improve the surface finish but also to straighten any camber that might have been introduced during the hot-rolling steps. A very small reduction was made during each of the cold-rolling passes. The plate was passed a total of 6 times through the cold mill to bring it to the final thickness.

Following the cold rolling, the plate was annealed for 2 hours at 2000° F. in a dry hydrogen atmosphere to attain an annealed condition. There were no unbonded areas as indicated by a lack of blistering of encasing steel.

The procedure of Example I was followed with the modification that a pressure of 20,000 lbs. per square inch was applied by means of a hydraulic press to the assembled structure for bonding purposes. A good bond was obtained.

*Example II*

The procedure of Example I was repeated with the elements shown in FIG. 1. As in Example I, the elements were of stainless steel and the nuclear reactor fuel was composed of compacted stainless steel and uranium oxide powder. A satisfactory nuclear reactor fuel plate was obtained as in Example I.

*Example III*

When the procedure of Example II is repeated with a core of steel and encasing elements of copper with the further modification that the assembled article is heated and pressed under vacuum, a good bond is obtained at the bonding surfaces.

When the procedure of Example III is repeated with the modification that the heating is performed in an atmosphere of helium followed by subsequent pressure bonding, a satisfactory product is obtained.

To illustrate the superiority of the process in this invention over the process in which no perforation is embodied in the element containing the uranium fuel, the following example is described for purposes of comparison.

*Example IV*

The elements of FIG. 4 were employed with the modification that the picture frame element 20 did not contain the aperture 24 nor the channel 26 or perforation 25. The structure was assembled as described in Example I except that upon welding of the two end plates to the element which contained the fuel compact, the weld was not made continuous all the way around the joint as shown in FIG. 5. Rather, an unsealed section was left in each of the welds at one end of the structure in order to permit gases to escape upon heating and subsequent hot rolling. The assembled structure was then heated in hydrogen and subjected to hot rolling on a steel rolling mill as described in Example I. It was found, however, that air diffused back through the opening left at the seam and oxidized the bonding surfaces with the result that unbonded areas were prevalent in the assembled and rolled structure. Upon annealing at 2000° F. in a dry hydrogen atmosphere for 2 hours, the areas which were not bonded developed blisters. Such blisters occurred within the area of finished plate and therefore the plate had to be rejected.

In performing the rolling operation described in the above examples, the number of passes through the rolling mill will be determined by the successive settings of the mill with respect to the reduction obtained per pass, and the final thickness of the finished product which is desired. Thus, there is no restriction on the number of passes through a rolling mill that an assembled structure is subjected to.

The sides of the plain fuel plate, after having been rolled on the steel rolling mill and annealed, were machined to final size and assembled into a fuel box assembly to form nuclear reactor fuel element. The assembly process and the fuel element is described in detail in a publication entitled "Fuel Elements for the Organic Moderated Reactor Experiment" bearing the designation NAA–SR–1934, issued by Atomics International, a Division of North American Aviation, Inc., December 15, 1957, and available from the Office of Technical Services, Department of Commerce, Washington 25, D.C. Fuel elements made up of fuel plates which were constructed by the process of this invention have been employed in an organic moderated reactor for a period equivalent to 750 megawatt days without failure of the cladding. A full description of the organic moderated reactor and its operation is found in Proceedings of the SRE-OMRE Forum held at Los Angeles, California, February 12 and 13, 1958, page 109 et sequem, publication No. TID–7533 (NAA–SR–2600), published by the United States Atomic Energy Commission and available from the Office of Technical Service, Washington 25, D.C.

While the illustrative examples given above were concerned with the encasement of a steel-uranium dioxide compact within a steel casing, the process works equally well with other known fuel compositions and claddings. Examples include the encasing of plutonium or uranium in zircalloy; uranium in steel; uranium 10%-thorium alloy in steel; uranium-molybdenum alloy in aluminum; uranium-aluminum alloy in aluminum; $UO_2$-aluminum compact in aluminum; refractory uranium compounds such as uranium carbide in aluminum, steel or zirconium. The process is also used for encasing nickel in steel, steel in copper, copper in nickel, zirconium in titanium, cadmium in zirconium, etc. The temperature at which bonding is accomplished under pressure depends on the metal which is being bonded. This is well known in the art and will not be discussed here.

The heating of the assembled structure is carried out in an atmosphere which is unreactive to the metals being heated so as to prevent contamination of the metal being encased and also to prevent the contamination of the surfaces to be bonded. For example, satisfactory bonding is obtained when the heating and subsequent pressure application is performed in a vacuum. Other atmospheres in which the assembled structure may be heated are helium, argon, xenon. Nitrogen may also be used as an inert gas when the metals being bonded and encased are such that do not react with the nitrogen to form nitrides at the temperatures employed.

The surfaces to be bonded are usually degreased with a suitable solvent such as a low boiling point hydrocarbon, acetone, trichloroethane or other solvent. The surface is usually roughened to minimize slippage while under pressure during the bonding operation. The roughening is accomplished by methods well known in the art such as grit blasting, and blasting with aluminum, silicon carbide or metal shot. The surface may also be roughened by scratch brushing, chemical etching, liquid honing, etc. All these processes are well known to those skilled in the art.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A method of manufacturing an article consisting of a core material completely encased in a metallic substance comprising (1) providing a first metallic member having at least a first surface, a second surface, and a third surface and containing a first aperture in a first portion of said member, a second aperture in a second portion of said member, and a perforation located in its third surface, said second aperture being connected to said perforation by a channel leading from said second aperture to said perforation and wherein said apertures connect said first surface to said second surface; a second metallic member designed to contact all points on said first surface which are located along the periphery of said apertures when placed in juxtaposition to said first member along said first surface; a third metallic member designed to contact all points on said second surface of said first member which are located along the periphery of said apertures when placed in juxtaposition to said first member along said second surface; and a core material which is stable at the bonding temperature of said members; (2) placing said core material in said first aperture, placing said second member in juxtaposition to said first member along said first surface, and placing said third member in juxtaposition to said first member along said second surface, said second member and said third member being placed so as to completely enclose said first aperture and said second aperture; (3) sealing said second member and said third member to said first member along the outer edges of the area of contact of said second member and said third member with said first member to form an assembled structure; (4) heating said assembled article to a temperature sufficient for bonding of said members; and (5) applying pressure to said heated assembled article in a direction normal to a plane passing through said first member and equidistant from said first and said second surfaces, said pressure being first applied along points at the outer edge of said structure adjacent a boundary line of said first aperture which is furthest removed from said second aperture, said points of pressure being progressively moved along the surface of said structure in the direction of said second aperture until the entire structure has been subjected to said pressure.

2. A method of manufacturing an article consisting of a core material completely encased in a metallic substance comprising (1) a first steel member having at least a first surface, a second surface, and a third surface, and containing a first aperture in a first portion of said first member, a second aperture in a second portion of said first member, and a perforation located in its third surface, said second aperture being connected to said perforation by a channel leading from said second aperture to said perforation and wherein said apertures connect said first and said second surfaces; a second steel member designed to contact all points on said first surface which are located along the periphery of said apertures when placed in juxtaposition to said member along said first surface; a third steel member designed to contact all points on said second surface of said first member which are located along the periphery of said apertures when placed in juxtaposition to said first member along said second surface; and a core material containing uranium which is stable at the bonding temperature of steel; (2) placing said core material in said first aperture, placing said second member in juxtaposition to said first member along said first surface, and placing said third member in juxtaposition to said first member along said second surface, said second member and said third member being placed so as to completely enclose said first aperture and said second aperture; (3) sealing said second member and said third member to said first member along the outer edge of the area of contact of said second member and said third member with said first member to form an assembled structure; (4) heating said assembled article in an atmosphere of hydrogen to a temperature sufficient for bonding of said members; and (5) applying pressure to said heated assembled article in a direction normal to a plane passing through said first member and equidistant from said first and said second surfaces, said pressure being first applied along points at the outer edge of said structure adjacent a boundary line of said first aperture which is furthest removed from said second aperture, said points of pressure being progressively moved along the surface of said structure in the direction of said second aperture until the entire structure has been subjected to said pressure, and wherein said presure is sufficient to reduce the value of the dimension of said structure measured perpendicularly to said plane.

3. The method of claim 2, wherein said core material is composed essentially of uranium oxide and steel.

4. A method of manufacturing an article consisting of a core material completely encased in a metallic substance comprising (1) providing a first metallic member having at least a first surface, a first cavity in said first surface, a second cavity in said first surface, a second surface of said metallic member perpendicular to said first surface, a perforation in said second surface, said second cavity being connected to said perforation by a channel leading from said second cavity to said perforation, a second metallic member designed to enclose said first cavity and said second cavity when placed over said cavities and in juxtaposition to said first member, and a core material which is stable at the bonding temperature of said members; (2) placing said core material in said first cavity and placing said second member in juxtaposition to said first member so as to enclose said first cavity and said second cavity; (3) sealing said first member to said second member along the outer edge of area of contact of said members with each other to form an assembled structure; (4) heating said assembled article to a temperature sufficient for bonding of said members; and (5) applying pressure to said heated assembled structure in a direction normal to a plane passing through the points of contact of said members with each other, said pressure being first applied along points at the outer edge of said structure adjacent a boundary line of said first cavity which is farthest removed from said second cavity, said points of pressure being progressively moved along the surface of said structure in the direction of said second cavity until the entire structure has been subjected to said pressure.

References Cited in the file of this patent

UNITED STATES PATENTS

| | | |
|---|---|---|
| 2,416,400 | Mehl | Feb. 25, 1947 |
| 2,713,196 | Brown | July 19, 1955 |
| 2,745,172 | Townsend | May 15, 1956 |
| 2,786,265 | Keay | Mar. 26, 1957 |
| 2,813,073 | Saller et al. | Nov. 12, 1957 |
| 2,820,751 | Saller | Jan. 21, 1958 |
| 2,846,762 | Walker et al. | Aug. 12, 1958 |
| 2,916,815 | Bean et al. | Dec. 8, 1959 |
| 2,920,025 | Anderson | Jan. 5, 1960 |
| 2,961,761 | Watson et al. | Nov. 29, 1960 |
| 2,986,504 | Goslee et al. | May 30, 1961 |

UNITED STATES PATENT OFFICE
CERTIFICATE OF CORRECTION

Patent No. 3,091,847                                                        June 4, 1963

Ernest J. Peters

It is hereby certified that error appears in the above numbered patent requiring correction and that the said Letters Patent should read as corrected below.

Column 1, line 35, for "9,204" read --9, 204 --; column 5, line 70, for "from" read -- for --; column 8, line 2, for "TID-7533" read -- TID-7553 --; column 10, line 54, for "2,916,815" read -- 2,915,815 --.

Signed and sealed this 31st day of December 1963.

(SEAL)
Attest:
ERNEST W. SWIDER                                     EDWIN L. REYNOLDS Attesting Officer                                       Acting    Commissioner of Patents